UNITED STATES PATENT OFFICE.

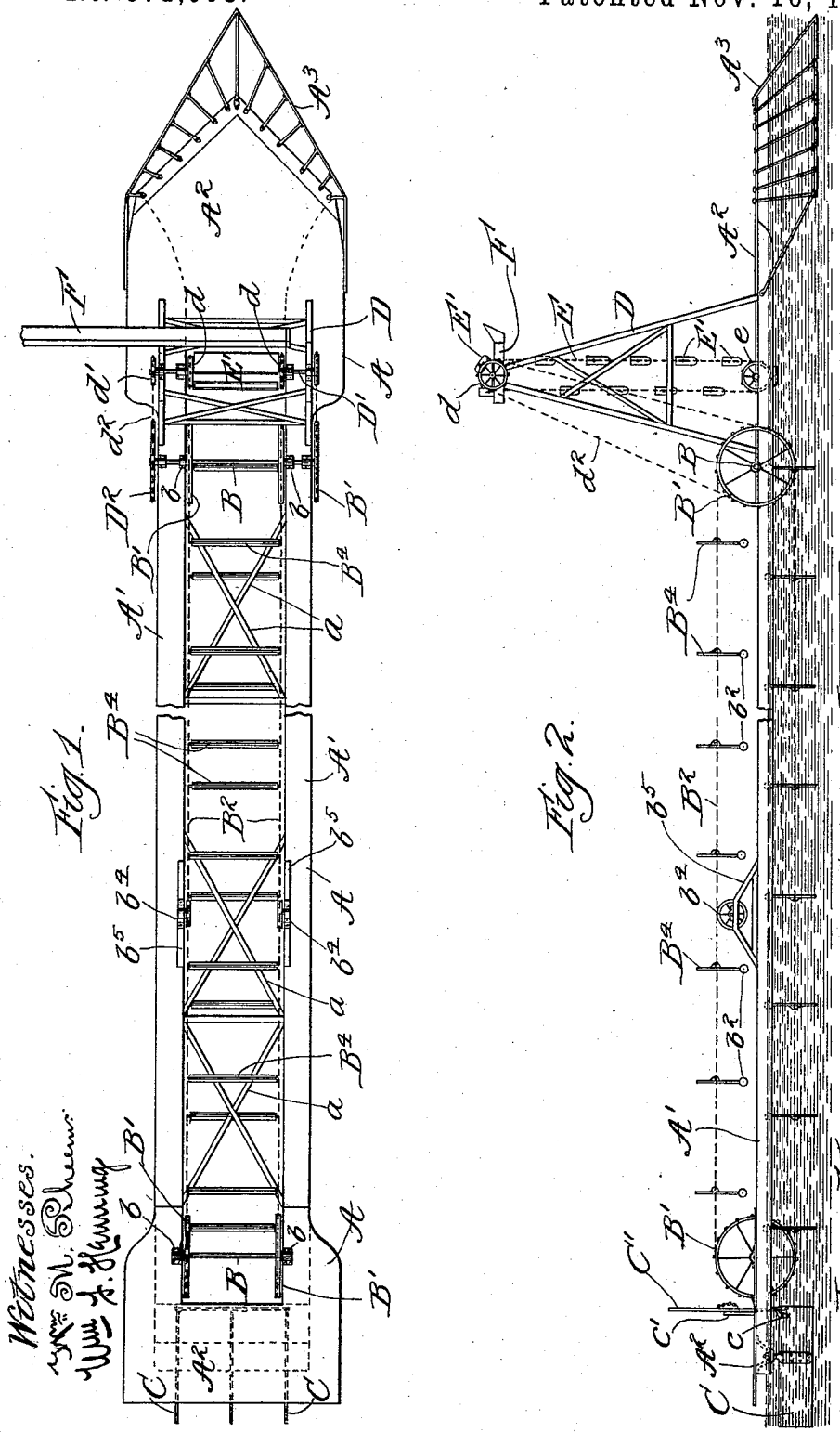

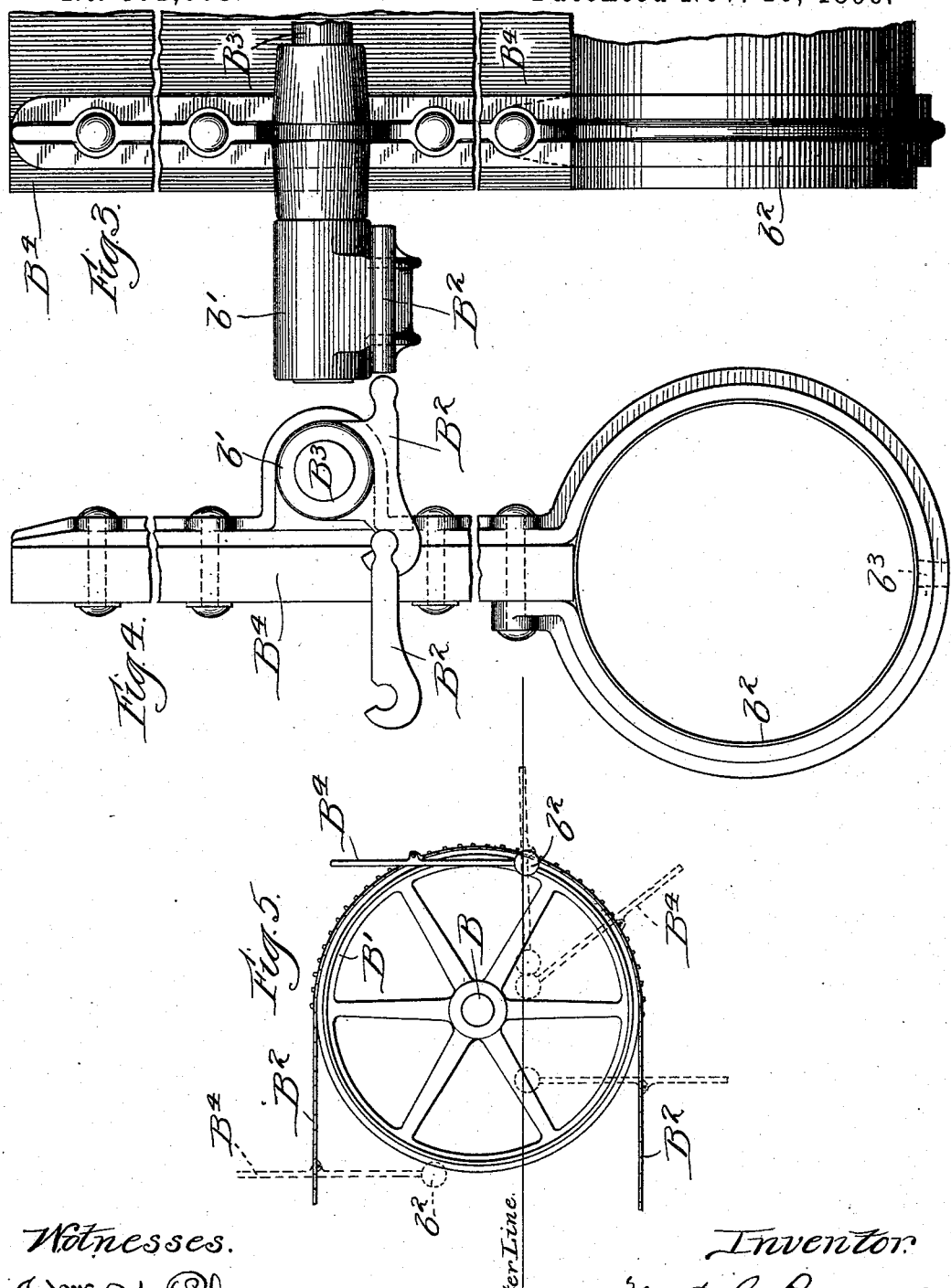

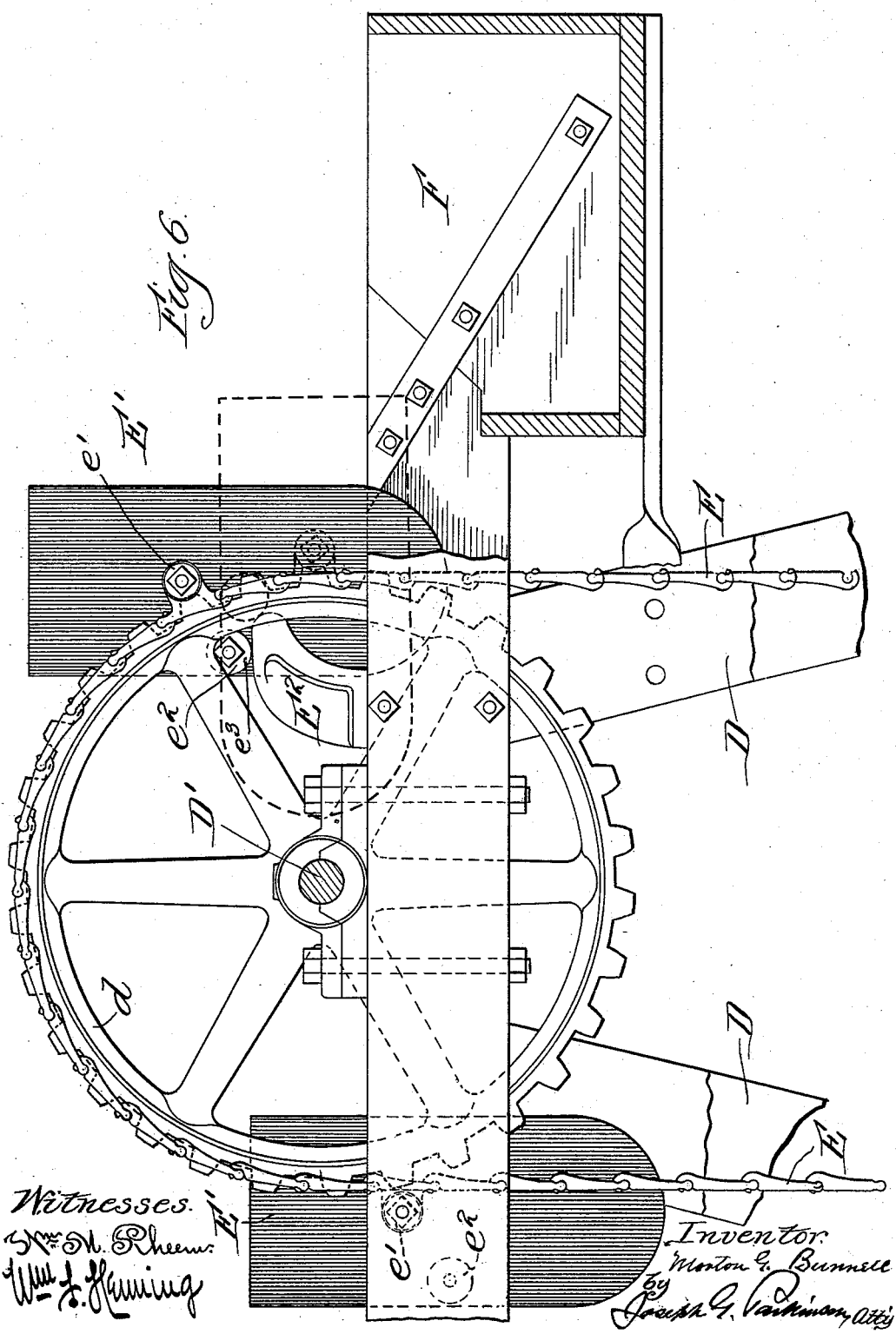

MORTON G. BUNNELL, OF CHICAGO, ILLINOIS, ASSIGNOR TO FREDERICK C. AUSTIN, OF SAME PLACE.

CURRENT-MOTOR.

SPECIFICATION forming part of Letters Patent No. 571,063, dated November 10, 1896.

Application filed January 30, 1895. Renewed October 8, 1896. Serial No. 608,304. (No model.)

*To all whom it may concern:*

Be it known that I, MORTON G. BUNNELL, a citizen of the United States, residing at Chicago, in the county of Cook and State of Illinois, have invented certain new and useful Improvements in Current-Motors, of which the following is a specification.

My invention relates, primarily, to that class of current-motors in which endless chains carrying paddles are supported upon a pontoon structure or float anchored in the stream; and as to this it consists in combining with the motor-chain floats which support the under ply thereof in the water and serve to relieve friction from sag; in providing each paddle with a float, which floats hold the paddles upright while in the water and carry the lower ply of the chain, reducing friction, but on the return are inverted, swinging the paddles to a perpendicular position and emptying themselves of any water that they may have admitted, a hole being provided for that purpose in the top of each float.

It consists, further, in pivoting each paddle to the chains on its central transverse axis, whereby the current passes equally above and below the chains, tending to maintain the paddle in its upright position transverse to the flow and in so controlling it that it is caused to enter the water by a half-revolution, and when withdrawn therefrom it returns on the same half-revolution.

The invention relates, further, to a water-elevator used in connection with this current-motor, and it consists, as to this, in so pivoting and controlling the buckets upon the endless chain that when they strike the water they are rocked around and turned open side down and when leaving it emerge open side up, and when reaching the top are automatically dumped and immediately swing around bottom side down.

Other features and details of the invention will appear from the ensuing description.

In the drawings, Figure 1 is a top plan view of a machine embracing my invention. Fig. 2 is a side elevation thereof. Figs. 3 and 4 are enlarged details of one of the paddles, seen, respectively, from the front and edge; Fig. 5, an enlarged detail of one of the motor-chains, paddles, and sprocket-wheel at the advanced end of said chain, explaining the manner in which the paddles enter the water; and Fig. 6, an enlarged detail of the top end of the water-elevator, explanatory of the dumping arrangement for the buckets.

A represents the frame of the pontoon, having two lateral air chambers or floats A', united at their ends by bridge plates or planking or other suitable ties $A^2$, which are of sufficient height to bridge and offer no obstruction to the flow of the water through the runway between the lateral floats. Along the length also are diagonal braces to tie one float to the other. The front of the pontoon or that part directed upstream is provided with a skeleton fender $A^3$, of metal or any suitable material, in shape approximating the cow-catcher of a locomotive, strongly braced from the frame and dipping into the stream sufficiently to ward off floating logs or debris, which might injure the paddles or other effective agents of the motor.

Mounted in journals $b$ at the front and rear of the lateral floats of the pontoon are shafts B, to each of which are pinned two sprocket-wheels B', one close to the inner face of each pontoon-float, and upon these wheels are mounted chains, cables, or other suitable carrying devices, which are parallel with the pontoon-floats on their respective sides. At intervals upon these chains and in line transversely of the pontoon from one chain to another are journals $b'$, formed upon individual links, in which swing the rock-shafts $B^3$ of the paddles $B^4$, which may be described as broad plates pivoted, for the purposes of the present description and preferably, though not necessarily, on practically their central axis and provided along the edge which is to be uppermost when the paddle is in the water with air chambers or floats $b^2$, of any suitable outline, to sustain the paddle upright in the water. These chambers may have perforations $b^3$ in their tops to discharge any water admitted by leakage while they are in the stream, it being understood that they may serve as weights to reverse the position of the paddles when the latter are withdrawn from the stream, and will so serve when the paddles are to be withdrawn in the particular manner hereinbefore pointed out. They have a further function in that they sustain the lower ply of the chains while it passes through the water, thus diminishing drag and friction, and as to this it is evident that they may be independent of the paddles. The upper ply is sustained at points along its length by idle-pulleys $b^4$, mounted upon brackets $b^5$, from the lateral floats. With this construction the paddles strike the water in a vertical position, air chamber or float first, as indicated in Fig. 5, and are tipped by the action of the current, as diagrammatically indicated in said figure, until they have described a half-revolution, bringing the air chamber or float on top, when the force of the current, pressing equally on both sides of the pivots in case they are central, or about so, as above proposed, of the blades, carries the paddles downstream in this vertical position. On leaving the water this half-revolution is reversed, that is, the paddles turn back, the air chamber or float as it is lifted out being still carried downstream, or, rather, floating downstream, until the blade is completely withdrawn and swung to a vertical position, and then swinging, in case it is used as a weight, to retain this vertical position during the forward movement of the blade above the water, as indicated in Fig. 2, thus dispensing with cams or guides acting upon the heels of the paddles and the tendant friction.

To preserve the fore-and-aft alinement of the pontoon with the direction of the current or to set it obliquely thereto, as may be desired, rudders C, one or more, are pivoted beneath the bridge-planks connecting the rear ends of the pontoon-floats. In the present instance three rudders C are shown, connected at their forward ends by a controlling-bar $c$, which in turn is operated by a lever $C'$, so as to throw the rudders in unison. A segment-rack $c'$ serves to hold the lever in any given adjustment.

By means of any suitable transmitting agent power can be communicated from the motor thus far described to such machinery as it is desired to drive. It is the primary purpose to employ it with mechanism for raising water. To this end a suitable frame D is constructed upon the front ends of the pontoon-floats in advance of the paddle-chains, and a shaft $D'$ is journaled in bearings at its top. This shaft has sprocket-wheels $d$, which may be and are shown as at the same distance apart as the sprocket-wheels of the motor-chains, and upon an extension has another sprocket-wheel $d'$, receiving motion by means of a chain $d^2$ from a larger driving-sprocket $D^2$ on the front shaft of the motor-chains. Over the sprockets of the shaft $D'$ are thrown chains E, which at their lower ends run upon idle-sprockets $e$, that just dip into the water. Buckets $E'$ are suspended between these chains, reaching from one chain to the other, and pivoted thereto by journals $e'$ a slight distance above their center of gravity, so that they will retain an upright position when ascending or descending, but will be readily tipped when their bottoms strike the water, and thus automatically filled. Studs $e^2$ project from the ends of the buckets just below the pivots and in rear thereof, so as to strike cams $E^2$, fixed to the crown-beam of the frame, as indicated in Fig. 6, and thereby tip the buckets and empty their contents as they are on the descending side of the upper sprockets, and these studs can be provided with idle-rollers or rollers can be arranged in the cams to lessen friction.

A trough F, extending laterally from the frame, receives the emptied contents of the buckets when they are tipped and conveys the stream shoreward, while the buckets immediately after being tipped and passing off of the cam resume their vertical position until they reach and strike the water and they are tipped and filled as they pass beneath the idle-sprockets. In the construction thus described it will be observed that all the friction of the water on the buckets, paddles, floats, and chains works in harmony, the drive being constantly in one direction, tending to further the end in view instead of being against the machine, as common in most machinery.

I do not intend to limit myself herein to specific details of construction, except as they may be distinctly defined and qualified in the claims, and it will be evident that many devices may be substituted for those herein indicated, as, for instance, cords, ropes, or cables for chains and cork or other buoyant material for air chambers or floats, all of which I deem equivalents for the elements hereinbefore enumerated.

I do not herein claim the features of construction embodied in the elevator portion of the device hereinbefore described, and illustrated in the drawings, as they will form the subject-matter of another application, and I only claim these features in combination with the current-motor so far as there is a community of operation between them independent of the specific construction of the elevating apparatus.

What I do claim, and desire to secure by Letters Patent, is—

1. In a current-motor, the combination with the motor-chains, of paddles provided with floats which serve to hold the paddles upright when in the water, substantially as described.

2. In a current-motor, the combination with the motor chain or chains, of the paddles provided with floats having perforations in their tops to discharge the water, substantially as in the manner set forth.

3. In a current-motor, the combination with the motor-chains, of paddles pivoted thereto upon their transverse axes and provided with floats so that the water-current causes the floats of the paddles to point downstream in their initial entrance therein and also as they are withdrawn therefrom, substantially as described.

4. In a current-motor, the combination with the motor-chains, of paddles pivoted thereto and having floats connected to the paddles so as to allow the paddles to enter the stream with a half-revolution and be withdrawn with a reverse half-revolution, substantially as described.

5. In a current-motor the combination with the motor-chains of paddles pivoted thereto having air chambers or floats at their upper edges.

6. In a current-motor the combination with the motor-chains of paddles pivoted thereto and floats of overbalancing weight attached to the upper ends of the paddles whereby the paddles are inverted when traveling along the upper ply of the chains.

7. In a current-motor the combination with the motor-chains of paddles pivoted thereto and provided with overbalancing floats perforated through the top to discharge leakage when inverted.

MORTON G. BUNNELL.

Witnesses:
FLORENCE KING,
LEE D. PARKINSON.